(12) United States Patent
Sahota et al.

(10) Patent No.: US 11,026,024 B2
(45) Date of Patent: Jun. 1, 2021

(54) SYSTEM AND METHOD FOR PRODUCING AUDIO DATA TO HEAD MOUNT DISPLAY DEVICE

(71) Applicant: Samsung Electronics Co., Ltd., Suwon-si (KR)

(72) Inventors: Sarvesh Sahota, Jalandhar (IN); Karthikeyan Somanathan, Bangalore (IN); Trivikram Annamalai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/348,338

(22) PCT Filed: Nov. 17, 2017

(86) PCT No.: PCT/KR2017/013085
§ 371 (c)(1),
(2) Date: May 8, 2019

(87) PCT Pub. No.: WO2018/093193
PCT Pub. Date: May 24, 2018

(65) Prior Publication Data
US 2019/0273990 A1    Sep. 5, 2019

(30) Foreign Application Priority Data

Nov. 17, 2016  (IN) .............................. 201641039237
Nov. 15, 2017  (IN) .............................. 201641039237

(51) Int. Cl.
*H04R 5/02*    (2006.01)
*H04R 5/033*   (2006.01)
(Continued)

(52) U.S. Cl.
CPC ........... *H04R 5/0335* (2013.01); *G02B 27/01* (2013.01); *H04R 5/02* (2013.01); *H04R 5/033* (2013.01);
(Continued)

(58) Field of Classification Search
CPC .......... H04R 2201/401; H04R 2460/13; H04R 2205/022; H04S 2420/01
See application file for complete search history.

(56) References Cited

U.S. PATENT DOCUMENTS 6,463,157 B1 * 10/2002 May ....................... H04R 1/083
                                                              310/324
8,325,964 B2    12/2012 Weisman
(Continued)

FOREIGN PATENT DOCUMENTS

CN       204859508 U     12/2015
KR    10-2016-0005695 A   1/2016
(Continued)

OTHER PUBLICATIONS

Extended European Search Report dated Oct. 14, 2019, issued in European Patent Application No. 17871184.2-1207.
(Continued)

*Primary Examiner* — Ryan Robinson
(74) *Attorney, Agent, or Firm* — Jefferson IP Law, LLP

(57) ABSTRACT

Embodiments herein provide a method for producing a binaural audio signal. The method includes detecting at least one audio signal and a current viewport information of a user wearing a Head Mounted Display (HMD) device. Further, the method includes determining a location of origin of the at least one audio signal based on the current viewport information. Further, the method includes determining the binaural audio data individually for each of vibrational transducers arranged on a support structure of the HMD (Continued)

device based on the location of origin of the at least one audio signal. Furthermore, the method includes presenting the binaural audio data the user using the corresponding vibrational transducer/using combined effect of all the vibrational transducers.

16 Claims, 15 Drawing Sheets

(51) Int. Cl.
*G02B 27/01* (2006.01)
*H04S 7/00* (2006.01)

(52) U.S. Cl.
CPC .......... *H04S 7/304* (2013.01); *H04R 2460/13* (2013.01); *H04S 2400/11* (2013.01); *H04S 2420/01* (2013.01)

(56) References Cited

U.S. PATENT DOCUMENTS

| | | | |
|---|---|---|---|
| 9,002,020 B1 * | 4/2015 | Kim ..................... H04R 17/10 | |
| | | | 381/56 |
| 9,226,090 B1 | 12/2015 | Norris et al. | |
| 9,756,444 B2 * | 9/2017 | Tsingos ................ H04S 3/002 |
| 9,794,691 B2 * | 10/2017 | Werris .................. H04S 7/304 |
| 9,961,474 B2 * | 5/2018 | Faller ................... H04S 3/008 |
| 10,003,904 B2 * | 6/2018 | Oh ........................ H04S 5/00 |
| 10,231,053 B1 * | 3/2019 | Mehra ................... H04S 7/30 |
| 10,419,843 B1 * | 9/2019 | Mehra ................... H04R 5/033 |
| 10,565,975 B2 * | 2/2020 | Woelfl .................. G10K 1/38 |
| 2006/0045295 A1 * | 3/2006 | Kim ...................... H04S 7/302 |
| | | | 381/310 |
| 2010/0128112 A1 | 5/2010 | Marti et al. |
| 2011/0301729 A1 | 12/2011 | Heiman et al. |
| 2013/0051585 A1 * | 2/2013 | Karkkainen ......... H04R 1/1075 |
| | | | 381/151 |
| 2014/0118631 A1 | 5/2014 | Cho |
| 2014/0153765 A1 | 6/2014 | Gan et al. |
| 2015/0373477 A1 | 12/2015 | Norris et al. |
| 2016/0088417 A1 | 3/2016 | Kim et al. |
| 2016/0124707 A1 | 5/2016 | Ermilov et al. |
| 2016/0241980 A1 | 8/2016 | Najaf-Zadeh et al. |
| 2017/0026751 A1 | 1/2017 | Suzuki et al. |
| 2017/0289729 A1 | 10/2017 | Oh et al. |
| 2018/0284894 A1 * | 10/2018 | Raut .................... G06F 3/016 |
| 2019/0200158 A1 * | 6/2019 | Verbeke ................ G06T 13/00 |

FOREIGN PATENT DOCUMENTS

| | | | | |
|---|---|---|---|---|
| WO | WO-2011051009 A1 * | 5/2011 | .............. A42B 3/30 |
| WO | 2015/141402 A1 | 9/2015 | |
| WO | 2016-108510 A1 | 7/2016 | |
| WO | WO-2017128481 A1 * | 8/2017 | ............ H04R 5/033 |

OTHER PUBLICATIONS

Indian Office Action dated Feb. 18, 2020; Indian Appln. No. 201641039237.

European Search Report dated Mar. 11, 2021; European Appln. No. 17 871 184.2-1207.

* cited by examiner

[Fig. 1]
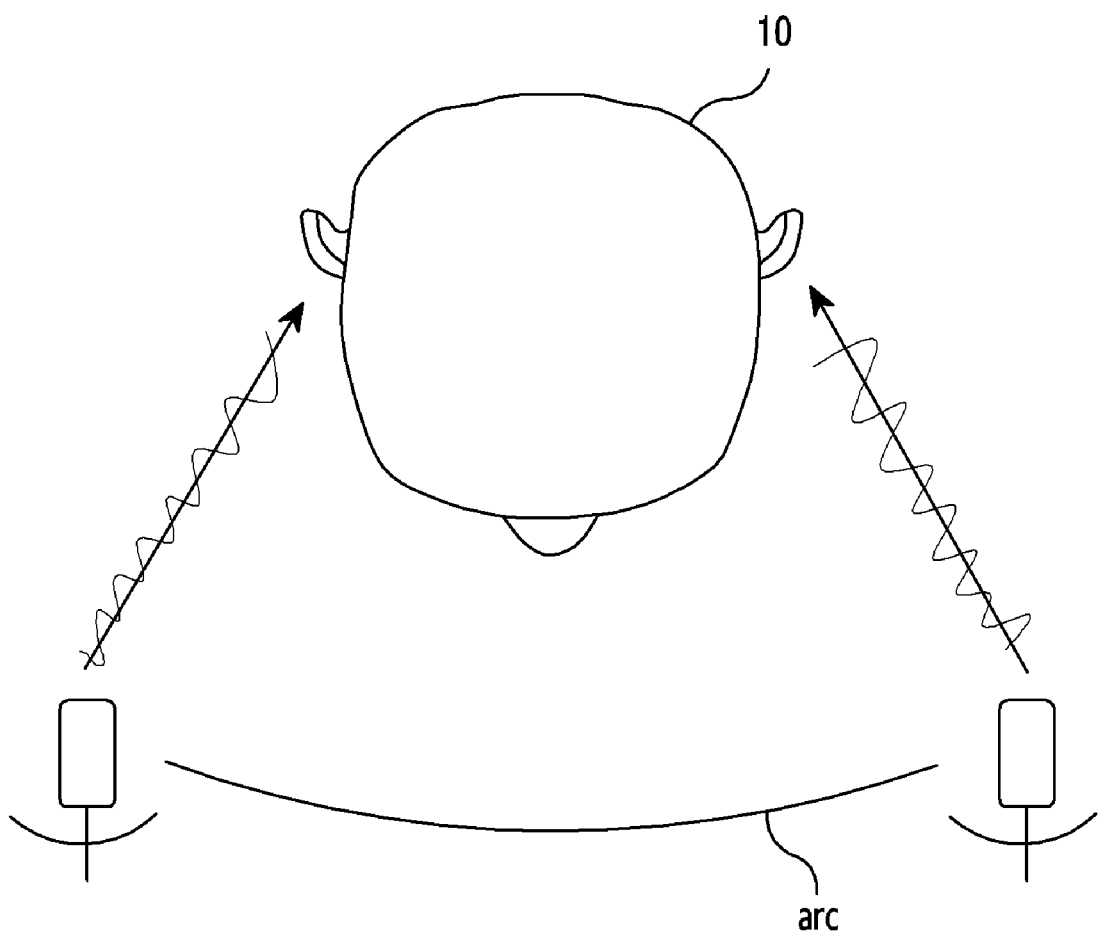

[Fig. 2A]
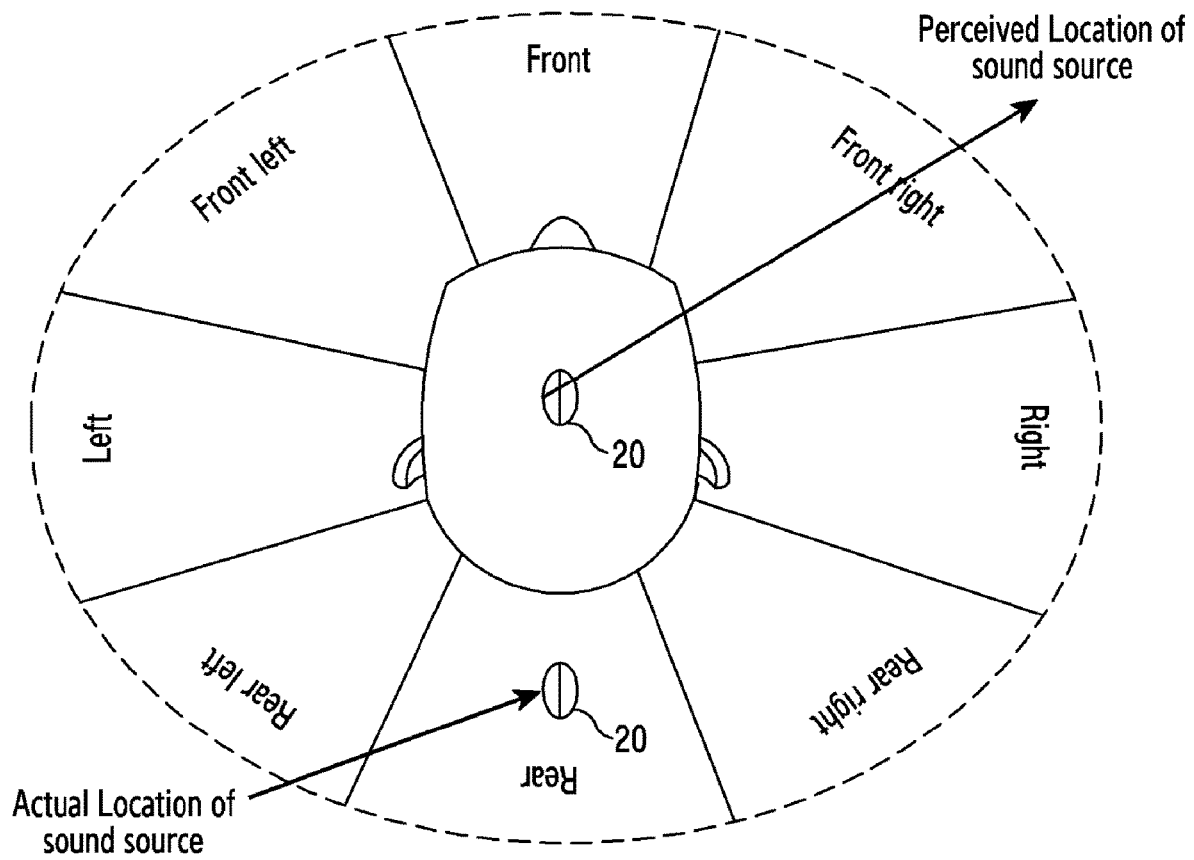
[Fig. 2B]
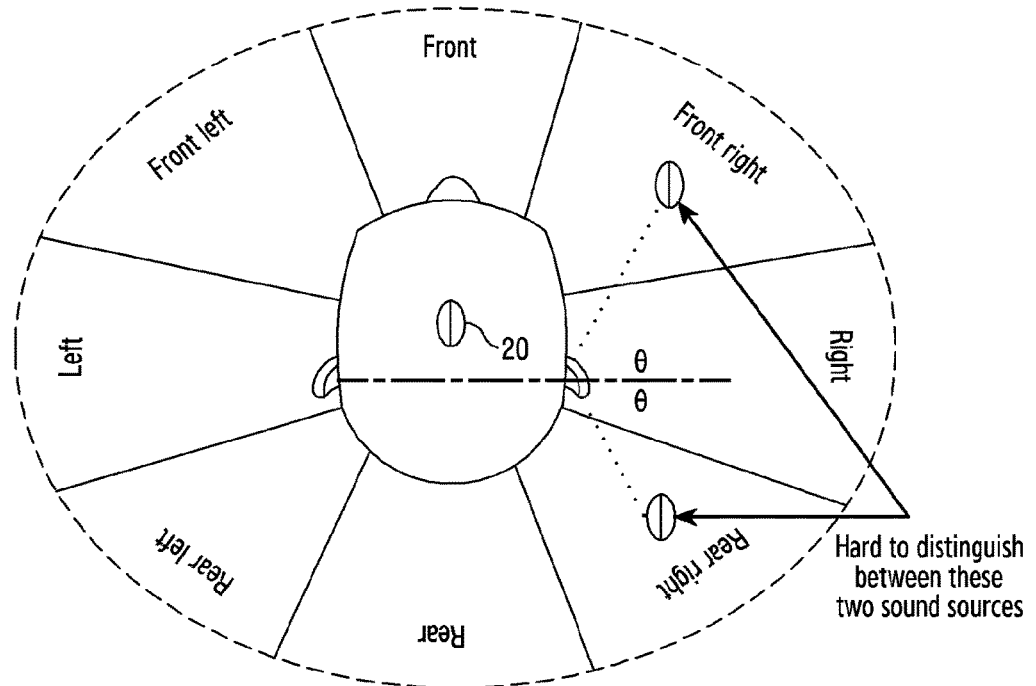

[Fig. 2C]
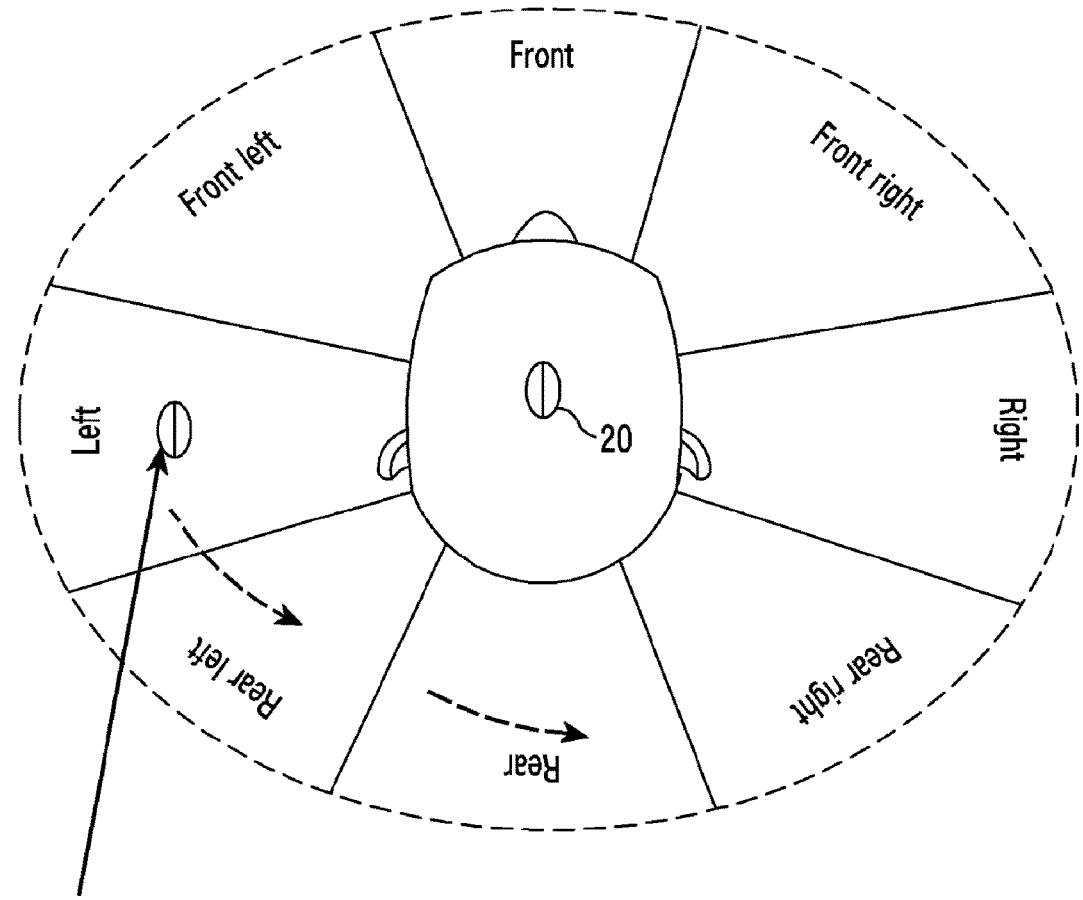
Rapid change in position of sound source leads to inaccurate results due to channel cross-talk

[Fig. 2D]
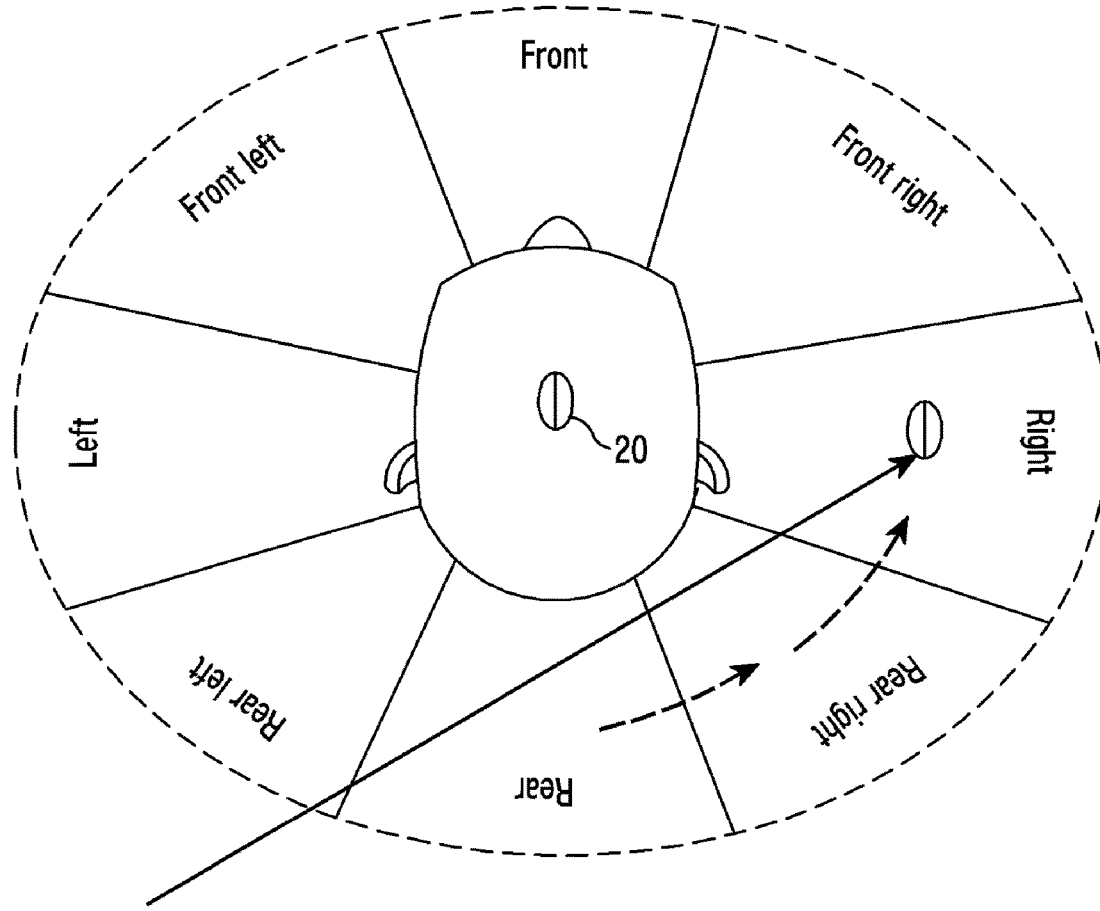
Rapid change in position of sound source leads to inaccurate results due to channel cross-talk

[Fig. 3A]
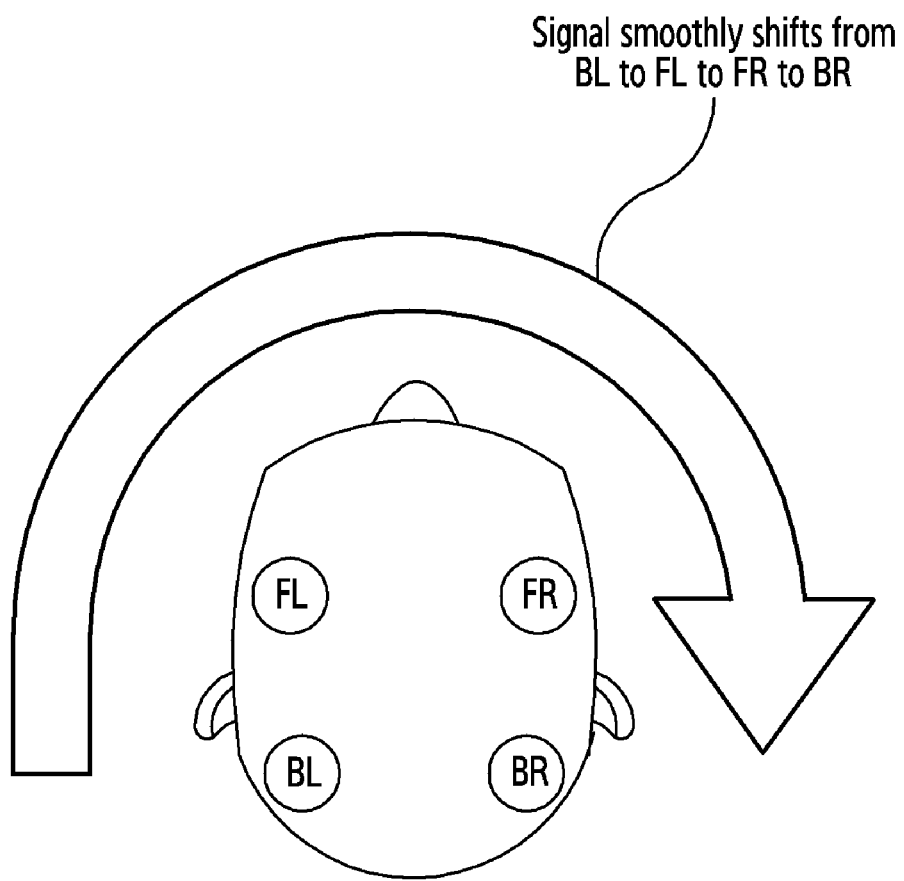

[Fig. 3B]
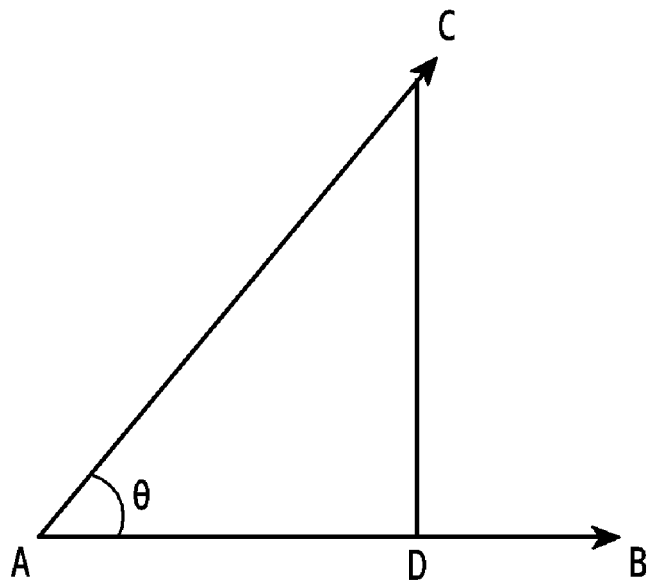
$|\overrightarrow{AC}|$ is the magnitude of Vector AC.
$$\cos\theta = \frac{\overrightarrow{AB} \cdot \overrightarrow{AC}}{|\overrightarrow{AB}| * |\overrightarrow{AC}|}$$
$\overrightarrow{ab}$ is the unit vector in the direction of $\overrightarrow{AB}$, given as
$$\overrightarrow{ab} = \frac{\overrightarrow{AB}}{|\overrightarrow{AB}|}$$

[Fig. 4A]
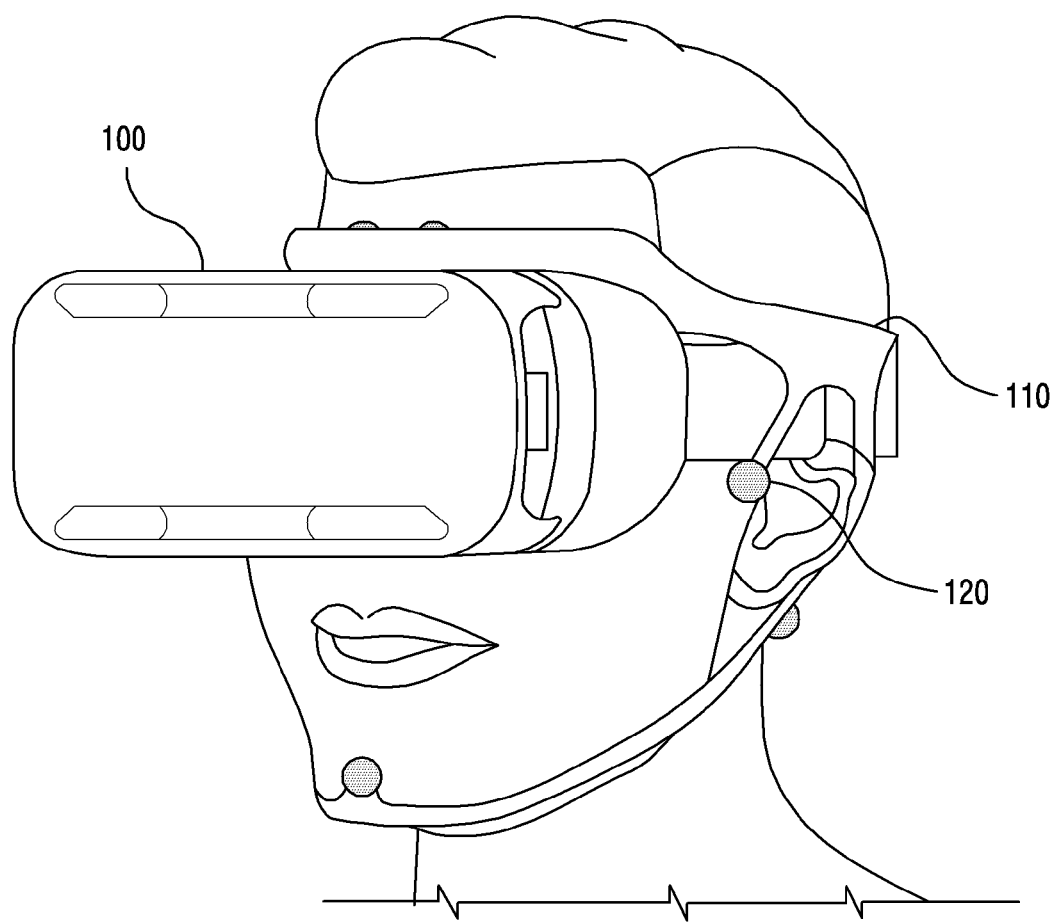

[Fig. 4B]
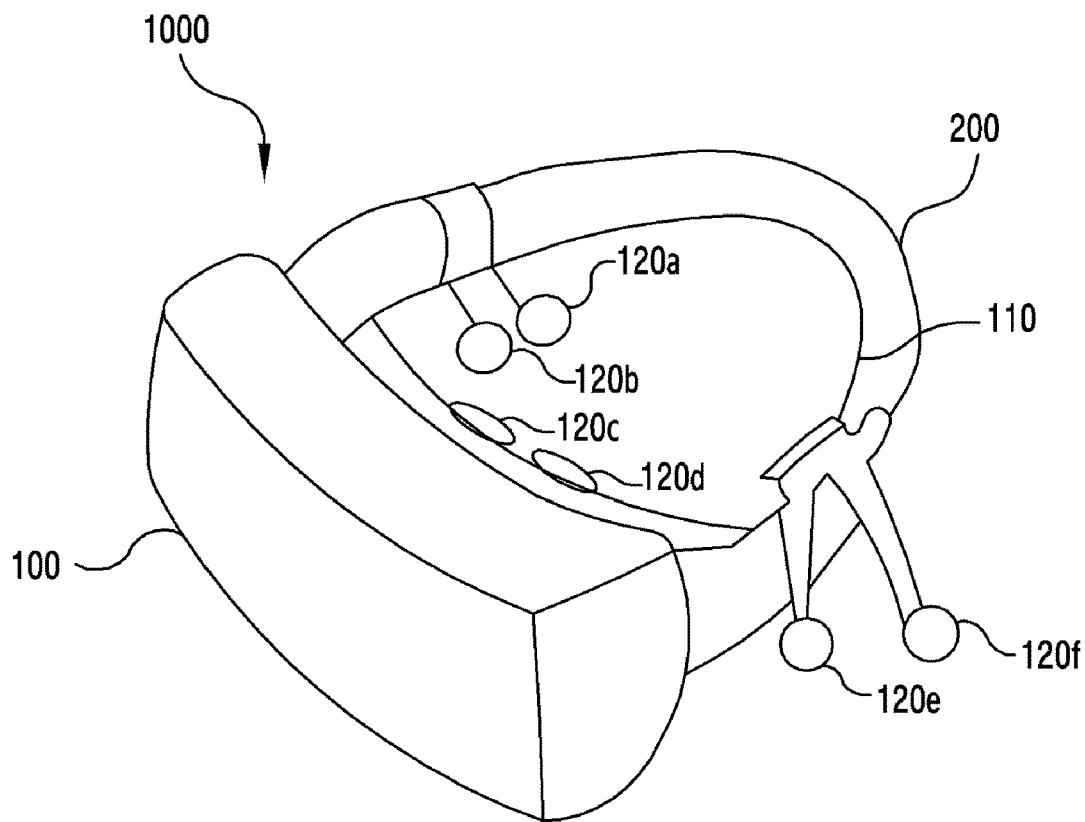
[Fig. 5A]
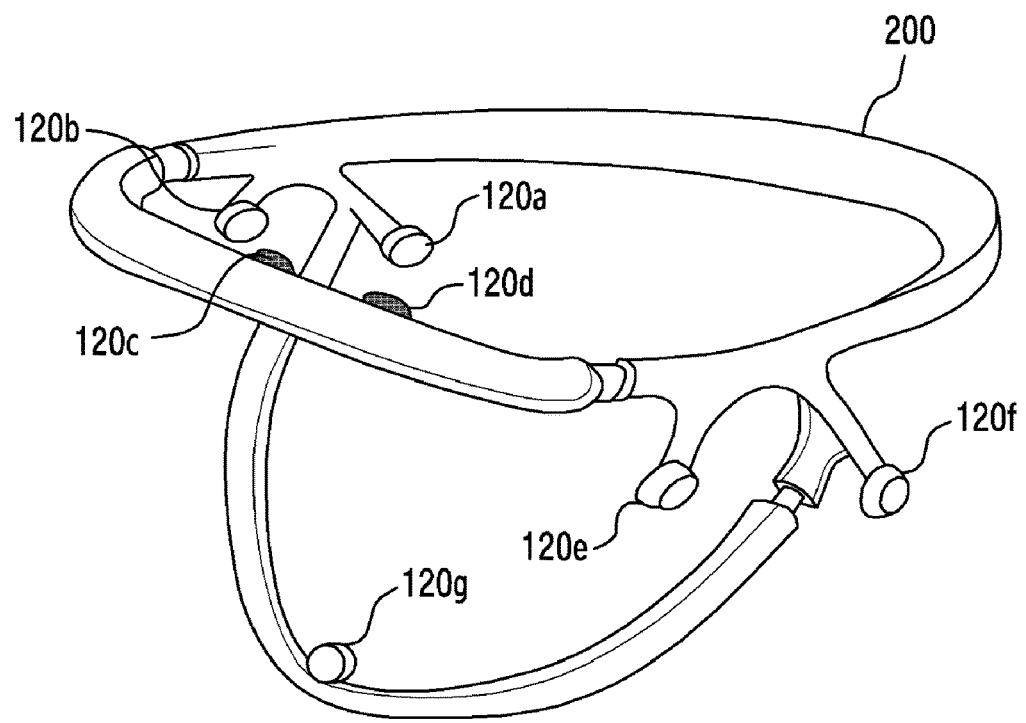

[Fig. 5B]
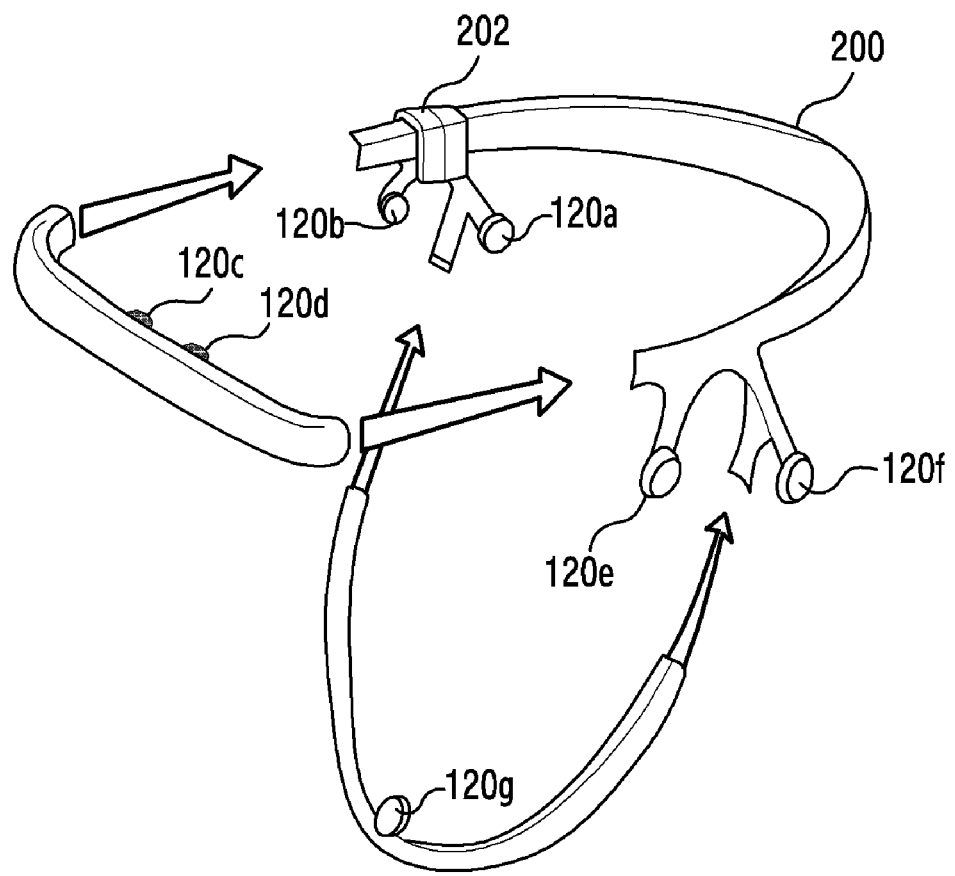

[Fig. 6A]
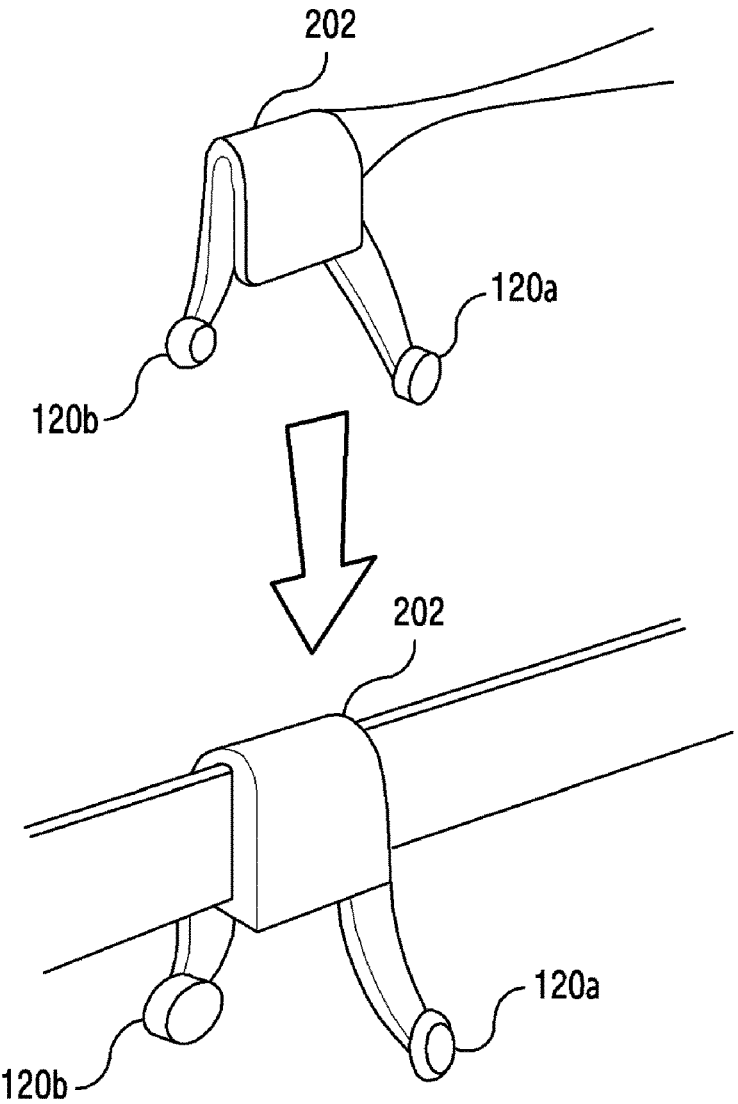
[Fig. 6B]
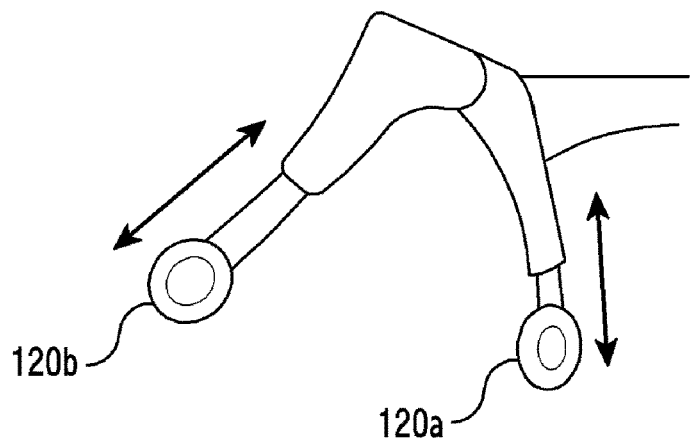

[Fig. 6C]
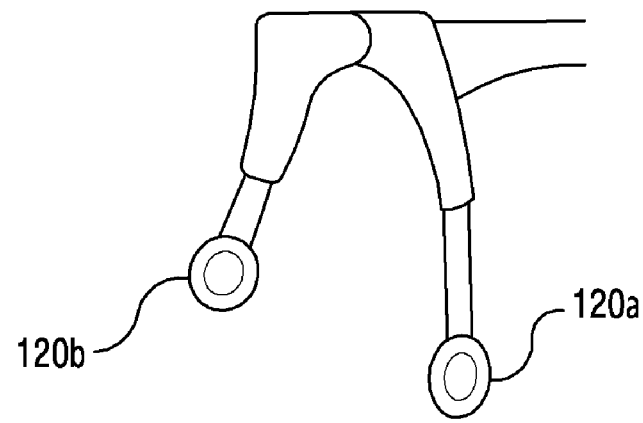
[Fig. 6D]
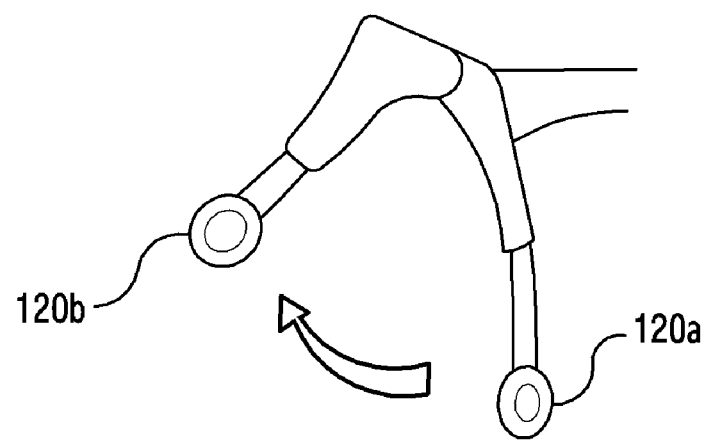

[Fig. 7]
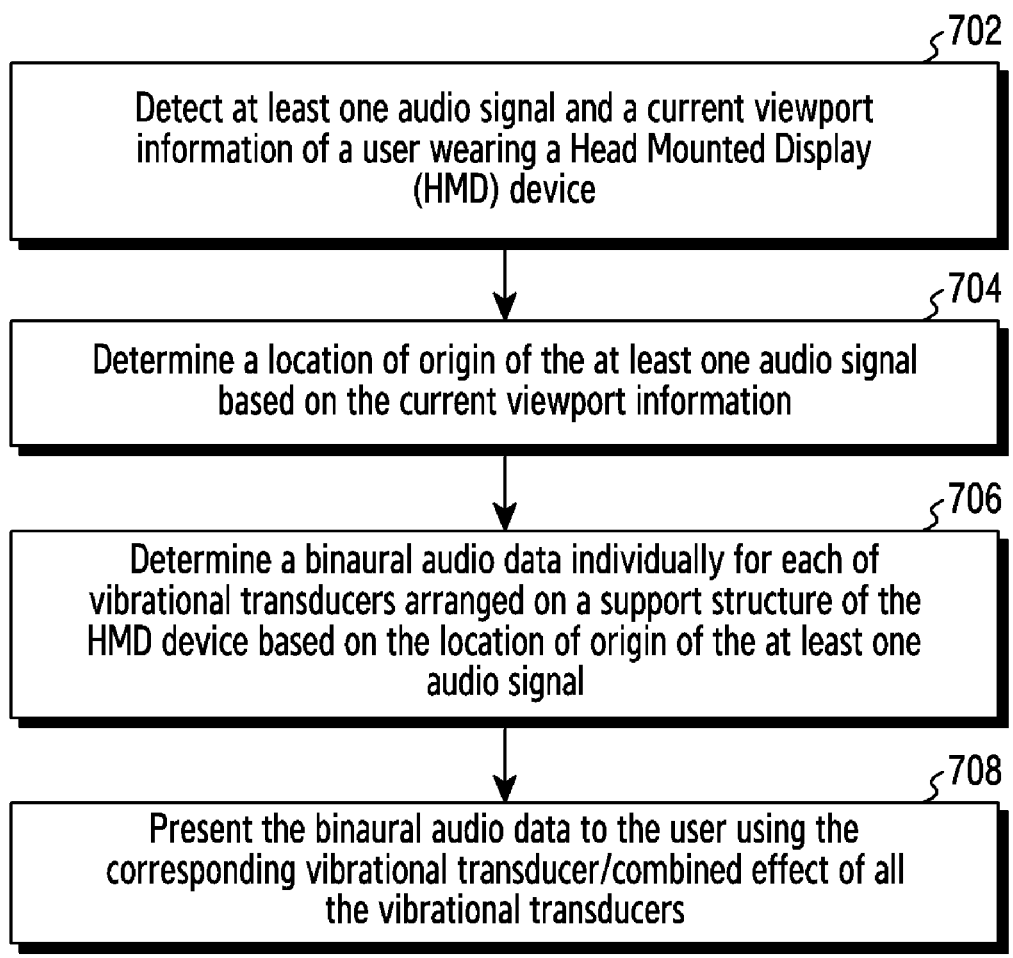

[Fig. 8]
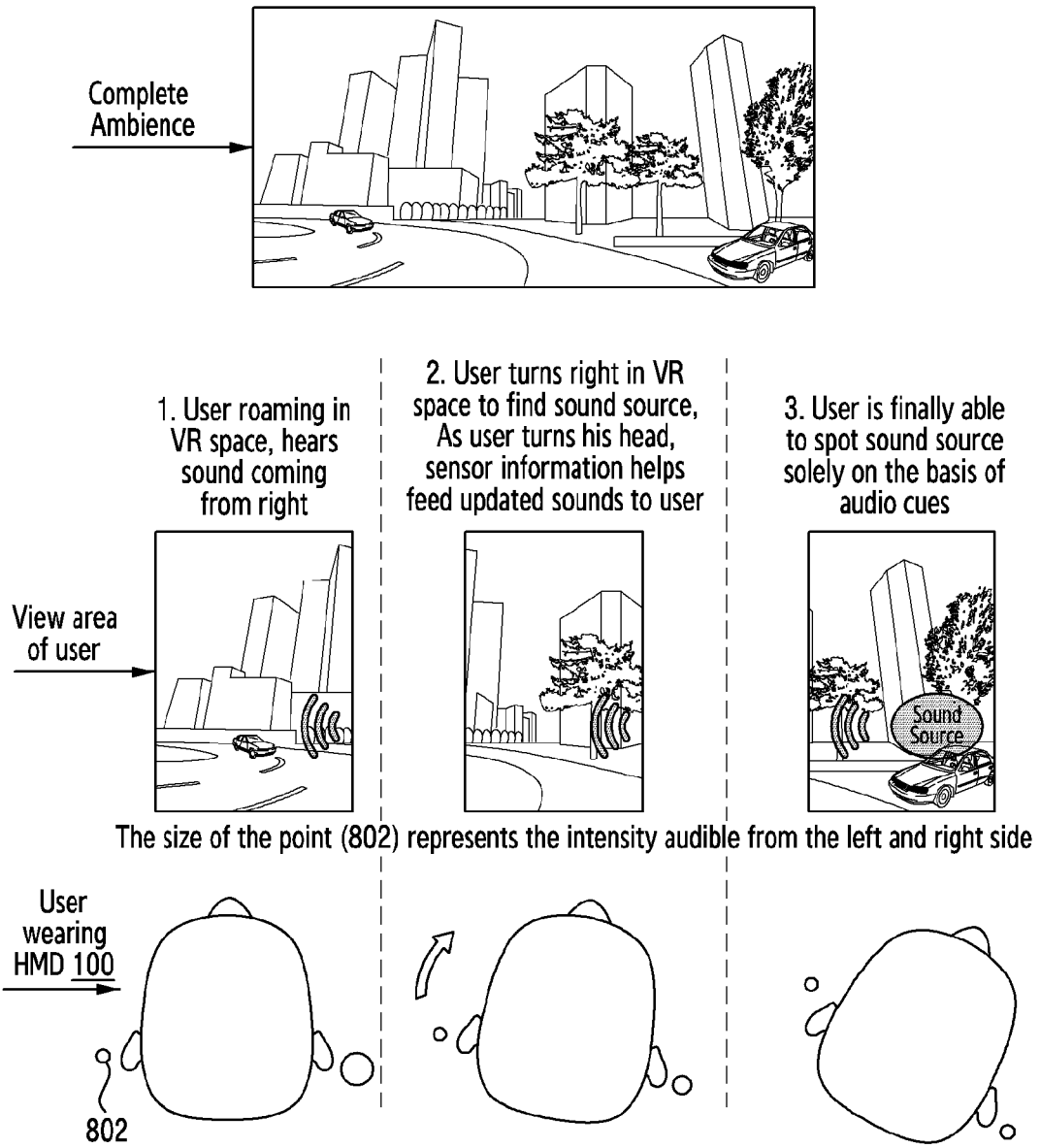

[Fig. 9]
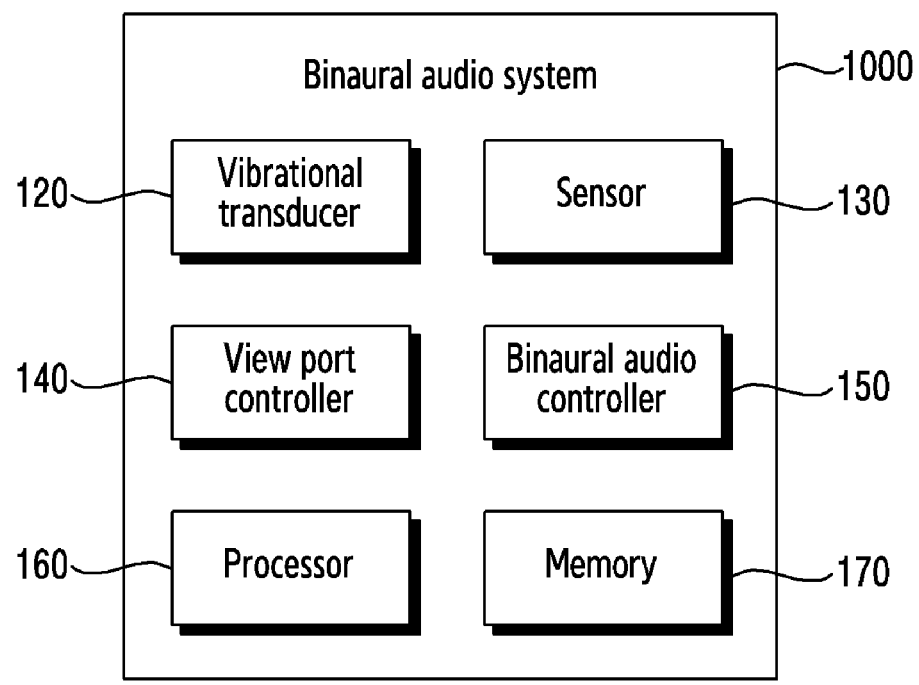

[Fig. 10]
Source receding :
$$f_{observed} = \left[\frac{v}{v + v_{source}}\right] f_{source}$$
Source approaching :
$$f_{observed} = \left[\frac{v}{v - v_{source}}\right] f_{source}$$
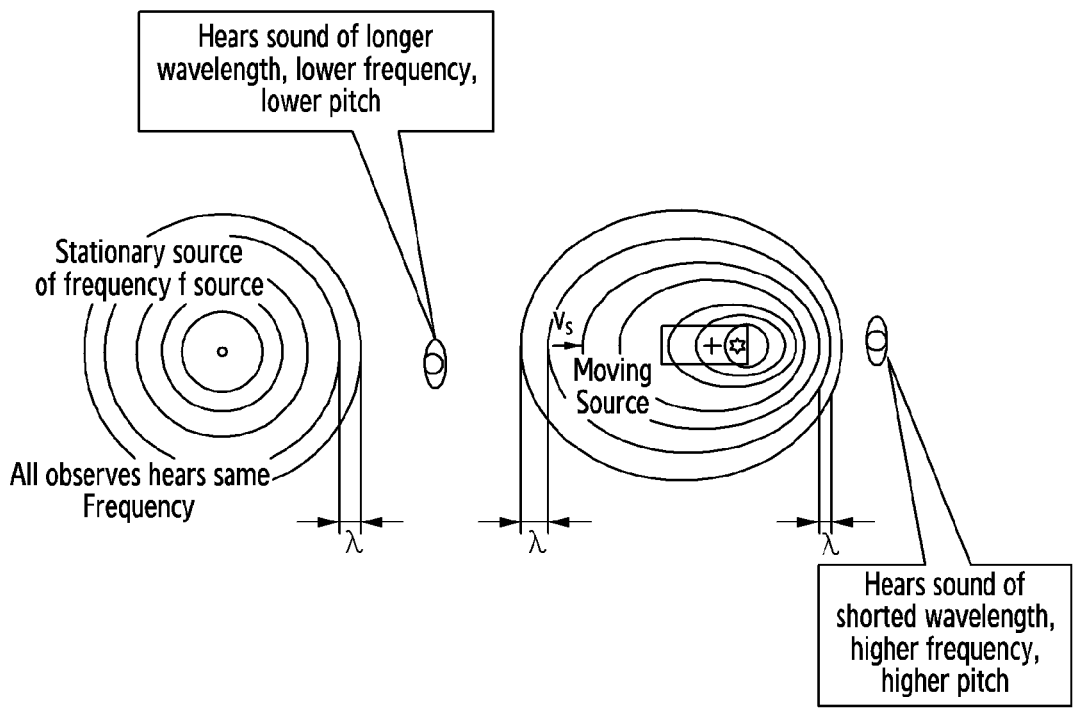

SYSTEM AND METHOD FOR PRODUCING AUDIO DATA TO HEAD MOUNT DISPLAY DEVICE

TECHNICAL FIELD

The present disclosure relates to a head mounted display (HMD) device, and more particularly, relates to system and method for producing audio data to the HMD device.

BACKGROUND ART

An audio signal outputted from a head mounted display (HMD) device (e.g., virtual reality (VR) devices, 3D devices, immersive experience devices) can be associated with a stereo (i.e., two sound channels). The audio signal can come from either a left or right direction of a user. In general, the audio signal is provided to the user, of the HMD device, by utilizing a normal air conduction mechanism through an ear canal of the user.

DISCLOSURE OF INVENTION

Technical Problem

The principal object of the embodiments herein is to provide a method and system for producing a binaural audio data to VR devices.

Another object of the invention herein is to provide a HMD device including a binaural audio controller configured to present the binaural audio data to the user using a plurality of vibrational transducers.

Another object of the invention herein is to provide a binaural audio system including a binaural audio controller configured to present the binaural audio data to the user using a plurality of vibrational transducers.

Another object of the invention herein is to provide a clip-on apparatus which utilizes bone conduction (BC) mechanism for transferring data till the skull.

Solution to Problem

Accordingly embodiments herein includes a Head Mounted Display (HMD) device capable of providing a binaural audio signal. The HMD device includes a support structure, a plurality of vibrational transducers arranged on the support structure, where each of the vibrational transducers are adapted to be placed in contact with a user at a location such that one or more of the vibrational transducers couple to a bone structure of the user when the HMD device is worn by the user. Further, the HMD device includes a binaural audio controller, operably coupled to each of the vibrational transducers, configured to detect at least one audio signal and a current viewport information of a user wearing the HMD device. Further, the binaural audio controller is configured to determine a location of origin of the at least one audio signal based on the current viewport information and location of the user. Furthermore, the binaural audio controller is configured to determine a binaural audio signal individually for each of the vibrational transducers arranged on a support structure of the HMD device based on the location of origin of the at least one audio signal and present the binaural audio data to the user using the corresponding vibrational transducer.

In an embodiment, the at least one vibrational transducers from the plurality of vibrational transducers is adapted to be placed in contact with a head area of the user.

In an embodiment, at least two vibrational transducers from the plurality of vibrational transducers is adapted to be placed in contact with at each ear area of the user.

In an embodiment, the at least one vibrational transducers from the plurality of vibrational transducers is adapted to be placed in contact with an chin area of the user.

Accordingly embodiments herein provide a method for producing a binaural audio signal. The method includes detecting at least one audio signal and a current viewport information of a user wearing a Head Mounted Display (HMD) device. Further, the method includes determining a location of origin of the at least one audio signal based on the current viewport information. Further, the method includes determining the binaural audio signal data individually for each of vibrational transducers placed on a support structure of the HMD device based on the location of origin of the at least one audio signal. Furthermore, the method includes presenting the binaural audio data to the user using the corresponding vibrational transducer.

In an embodiment, the method for determining the binaural audio signal individually for each of the vibrational transducers placed on the support structure of the HMD includes computing the location of origin of the at least one audio signal, determining a position of each of the vibrational transducers placed on the support structure of the HMD device. Further, this method includes individually computing the binaural audio signal for each of the vibrational transducers based on position of each of the transducers and the location of origin of the at least one audio signal.

In an embodiment, the viewport information includes a current field of view of the user, a position of the user in within an immersive space, a head-facing direction of the user.

In an embodiment, the binaural audio data is presented to the user using the corresponding vibrational transducer by directing the binaural audio data in proximity to an ear of the user at a location such that one or more of the vibrational transducers vibrationally couple to a bone structure of the user when the HMD device is worn by the user.

In an embodiment, the vibrational transducers are bone conduction transducers (BCTs).

Accordingly embodiments herein includes a binaural audio system for providing a binaural audio signal. The binaural audio system includes a plurality of vibrational transducers adapted to be placed on a support structure of a HMD device, where each of the vibrational transducers are adapted to be placed in contact with a user at a location such that one or more of the vibrational transducers vibrationally couple to a bone structure of the user when the HMD device is worn by the user. Further, the binaural audio system includes a binaural audio controller, operably coupled to each of the vibrational transducers, and is configured to utilize at least one audio signal and a current viewport information of the user wearing the HMD device. Further, the binaural audio controller is configured to utilize the location information of the user to determine a relative direction of the audio signal location with respect to the current viewport information of the user. Further, the binaural audio controller is configured to determine a binaural audio signal individually for each of the vibrational transducers arranged on the support structure of the HMD device based on the location of origin of the at least one audio signal. Furthermore, the binaural audio controller is configured to present the binaural audio data the user using the corresponding vibrational transducer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to various embodiments of the present disclosure, a user experience can be improved due to an authentic sound.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 1 is an example illustration in which an audio using two sound channels is provided to a user, according to prior art;

FIGS. 2A-2D, are various use cases in which drawbacks of providing two channel audio using HRTFs technique is detailed, according to prior art;

FIG. 3 is an example illustrating an effect of an audio signal perceived by the user wearing a HMD device, according to embodiments as disclosed herein;

FIG. 4A is an example illustration of the user wearing a HMD device, according to embodiments as disclosed herein;

FIG. 4B illustrates a binaural audio system, according to embodiments as disclosed herein;

FIG. 5 illustrates a cross sectional view of a clip-on apparatus, according to embodiments as disclosed herein;

FIGS. 6A-6D illustrate various modes of operating the clip-on apparatus, according to embodiments as disclosed herein;

FIG. 7 is a flow diagram illustrating a method for producing the binaural audio data to the HMD device, according to embodiments disclosed herein;

FIG. 8 illustrates a scenario in which a location of the sound source is detected by the user wearing the HMD, according to embodiments as disclosed herein;

FIG. 9 is a block diagram illustrating various components of the binaural audio system, according to embodiments as disclosed herein; and FIG. 10 is an example scenario in which a realistic Doppler effect can be obtained, according to embodiments as disclosed herein.

BEST MODE FOR CARRYING OUT THE INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "audio signal", "audio", "sound" and "sound signal" can be used interchangeably without departing from scope of the invention.

The term "HMD device" and "HMD" can be used interchangeably without departing from scope of the invention.

In general, influence of a 3D audio signal while viewing any 3D content enhances the user experiences. For e.g., if the user wearing a HMD device is currently leveraging the 3D gaming experience may undoubtedly require the 3D sound effect thereof. That means, if any subject in the game produces a sound signal at the back left (BL) location of the user (for e.g., a shooting game in which a bullet is fired by an opponent(s) of the user from the BL location of the user), then it is obligatory for the user to experience the sound effect originating from the same source location (that is, BL location), in contrast to the conventional methods and systems.

The HMD can provide a number of applications that involve audio playback. For instance, the HMD may be configured to play music, immersive viewing of the contents, etc. As a result, it may be desirable to include the binaural audio system (i.e., to produce binaural audio) in an HMD/associated with the HMD.

In an example embodiment, the binaural audio system may include an array of bone-conduction transducers (BCTs) on a support structure of the HMD device. Each BCT from the array of BCTs is configured to conduct audio signal to an inner ear of the user through bones around the head area. As a result, the BCTs may be particularly advantageous in the HMD because they can reduce/eradicate acoustic outflow to the environment around the user (as the audio signal is being transmitted to the user bone structure). Therefore, it is desirable for BCTs to have solid contact with the user's skull and chin. Further, the design of the array of BCTs is such that each BCT in the array of BCTs maintains good contact with the user's skull.

Unlike to conventional methods and systems, the proposed method can be used to provide a real-time true binaural sound to the user. This results in improving the 3D immersive experience of the user. For e.g., in the 3D space, if a location of an origin of the sound (that is, a location of a source of the sound) is from back right of the user, then according to the proposed method, the sound is seemed to be provided from the back right of the user. Thus, creating a 3D sound experience by accurately determining the location of the origin of the sound signal in a VR space with respect to the user and further based on a current viewport information of the user.

Referring now to the drawings, and more particularly to FIGS. 1 through 10, where similar reference characters denote corresponding features consistently throughout the figures, there are shown preferred embodiments.

There are several techniques attempted to provide a realistic audio signal (i.e., binaural sound) to the user, for e.g., the techniques such as an audio spanning technique, a head-related transfer functions (HRTFs) based technique, etc. But each of these techniques include one or more limitations thereto, as detailed below.

The audio stereo panning/widening: referring to FIG. 1, a left localized sound source provides a loud audio signal to the user from the left direction, and a right localized sound source provides a loud audio signal to the user from the right direction. Thus, the sound can appear to originate from anywhere along an arc from either the left or right direction by changing relative volume of the audio signal. Thus, this technique is limited with respect to the directionality of stereo sound and poor immersive experience.

HRTFs based technique: In this technique, a mic is placed on a dummy head and at the audio signal is bombarded from all directions on the dummy head, where the mic can be configured to estimate sound from all the direction surrounding the user. The limitation of this technique is that Interchannel cross-talk (rapid change in position of audio signal source) spoils directionality. Further, this technique can only be restricted for those users having similar head-size, as that of the dummy head for estimating HRTF. Thereby limiting the localization of this technique for all the users.

FIGS. 2A-2D, where the drawbacks of providing two channel audio using the HRTF techniques is detailed using different cases.

Referring to the FIG. 2A, when a sound source 20 (origin of sound signal) is behind a user, the current audio systems don't convey this information well, i.e., it seems as if the sound source 20 is inside a user head 10. Similarly, it is very hard to distinguish between sounds at the same angle in the front and the back of the ears (as shown in FIG. 2B). Further, if the sound source that is rapidly moving from the user back left to back right (as shown in FIGS. 2C-2D), the signals shift uncontrollably from the left to the right channel due to limited separation between channels. This leads to a lot of cross-talk which limits the localization of the sound source.

Although, the premise of this approach is to create an alternate reality with regards to audio, but without the right audio cues to match the visuals, a brain of the user does not able to perceive into the illusion. This approach fails to reproduce the audio experience that a user will have when sounds were around him in reality, rather than in virtual reality (e.g., when a sound source is located anywhere outside the arc, as shown in FIG. 1).

Thus there remains a need to provide an effective multichannel sound system for producing a binaural sound effect.

The above information is presented as background information only to help the reader to understand the present invention. Applicants have made no determination and make no assertion as to whether any of the above might be applicable as Prior Art with regard to the present application.

FIG. 3A is an example illustrating an effect of the audio signal perceived by the user wearing the HMD, according to embodiments as disclosed herein.

Unlike to conventional methods and systems (as detailed in FIG. 1 and FIGS. 2A-2D) the proposed method can be used to provide a realistic sound effect preserved even if the location of sound source changes rapidly around the user. For e.g., if a sound source rapidly moves from the listeners front left (FL) to front right (FR), then the user experience is improved. This is because now, the audio signal gradually changes from one channel to the other channel, and the channel separation is smoother. There is no cross-talk in channels, thus the sound is a lot more realistic (e.g., realistic Doppler effect, as shown in FIG. 10). Thus, referring to FIG. 3, the audio experience of the user is improved as the signal now changes in a controlled manner because there are more than two vibrational transducers involved to report the change in position of the sound signal. Thus, all the vibrational transducers (placed at BL, FL, FR, and BR) can absorb the effect of the rapid motion much better than in a stereo setting, and reliably reflect the same in the output without any cross-talk.

Referring to the FIG. 3A, the HMD of the user can include a plurality of vibrational transducers. According to various embodiments of the present disclosure, the vibrational transducer can alternatively or interchangeably be referred to as simply transducer. Using the vibrational transducers (for e.g., at least four vibrational transducers), the proposed method can be used to create/represent any point in 3D space (similar to any point in a 2D plane represented by three non-collinear points). Thus, the proposed method can be used to create, for e.g., four-channel sound signal that reaches the user through the four vibrational transducers and blends inside the brain of the user. This blended sound can provide a true binaural sound wave that can be produced in real-time, enhancing the VR experience. This setting is more ergonomic from the user stand-point and also enables a deaf user (deaf due to a damage to the 'outer' or 'middle' ear) to hear sound signal through the bone conduction.

For e.g., given any three non-collinear points, the proposed method can be used to express any point in that 2D plane (as shown in FIG. 3B). Referring to FIG. 3B, consider the three non-collinear points be A, B, and C, and D as to be the projection of AC on line AB. According to the proposed method, at least two vectors $\vec{AB}$ and $\vec{DC}$ can be constructed, where, $$\vec{AD} = |\vec{AC}| \cos \theta_{ab}$$

$$\vec{DC} = \vec{AC} - \vec{AD}$$

where, $|\vec{AC}|$ is the magnitude of vector AC, $$\cos\theta = \frac{\vec{AB} \cdot \vec{AC}}{|\vec{AB}| * |\vec{AC}|}$$

$\vec{ab}$ is the unit vector in the direction of $\vec{AB}$, given as:

$$\vec{ab} = \frac{\vec{AB}}{|\vec{AB}|}$$

Since $\vec{AB}$ is perpendicular to $\vec{DC}$, the proposed method can have 2 independent directions for this 2D system/plane. Thus, AB can be thought of as the x-axis of this plane and DC can be thought of as the y-axis. Hence, any point in this 2D-plane can be expressed as, $$P = \alpha\vec{ab} + \beta\vec{dc}$$

Herein, P is an arbitrary point in 2D-plane, a is a weight for vector $\vec{ab}$, β is a weight for vector $\vec{dc}$, $\vec{ab}$ is a unit vector of vector $\vec{AB}$, and $\vec{dc}$ is a unit vector of vector $\vec{DC}$.

Similarly, any point in 3D-space can be expressed as, $$S = \alpha\vec{x} + \beta\vec{y} + \gamma\vec{z}$$

Herein, S is an arbitrary point in 3D-space, a is a weight for vector $\vec{x}$, β is a weight for vector $\vec{y}$, γ is a weight for vector $\vec{z}$, $\vec{x}$ is a unit vector for x-axis, $\vec{y}$ is a unit vector for y-axis, is a unit vector for z-axis.

Further, the aforementioned techniques can also be extended to 3D space where at least four non-coplanar points are required, where any three points from the at least four non-coplanar points are non-collinear. The at least four non-coplanar points can be the position of the at least four vibrational transducers 120 on the HMD 100. Thus by knowing the 3D location of the at least four non-coplanar points in advance, the proposed method can be used to express any other point in the 3D space accurately. The α's, β's and γ's can be the actual intensities/weights imparted to each of the vibrational transducers 120 for successful localization of sound signal, in order to produce the 3D sound. Thus, any change in the source location results in change of a's, β's and γ's (i.e., weights of each of the multiple vibrational transducers 120/speakers).

FIG. 4A is an example illustration of the user wearing a HMD 100, according to embodiments as disclosed herein.

The HMD 100 can include, for e.g., VR display device, 3D glasses, eyeglass, display device that is capable of being worn on the head of the user and is configured to render content in view of the user thereof. It should be understood, however, that example systems and electronic devices may take the form of or be implemented within or in association with other types of the electronic devices, without departing from the scope of the invention.

FIG. 4B illustrates a binaural audio system 1000, according to embodiments as disclosed herein.

Referring to FIG. 4B, the binaural audio system 1000 includes the HMD 100 and a support structure 110. The support structure 110 can be configured to secure the HMD 100 to a user's face via a user's nose and ears, respectively. The support structure 110 can include, for e.g., lens frames, a frame support, lens elements, all of which are not shown herein. The support structure 110 may be formed of a solid structure of plastic and/or metal, or may be formed of a hollow structure of similar material so as to allow wiring and component interconnects to be internally routed through the HMD 100. Other materials may be possible as well. The lens elements may be formed of any material that can suitably display a projected image or graphic.

Further, the support structure 110 includes any expandable arms that may be positioned behind the user's ears to secure the HMD 100 to the user. Further, due the expandable arms of the HMD 100, the user with different head size and shapes can be easily worn thereof. The vibrational transducers can be placed according to the user's convenience where the sound heard is optimal.

The support structure 110 may further secure the HMD 100 to the user by extending around a rear portion of the user's head. Additionally or alternatively, for example, the HMD 100 may connect to or be affixed within a head-mounted helmet structure. Other configurations for the HMD 100 are also possible.

The binaural audio system 1000 also includes a plurality of vibrational transducers 120a-120f (hereinafter can used interchangeably with vibrational transducer 120) arranged on the support structure 110. The vibrational transducer 120 can be a speaker for generating audio output. In one example, the vibrational transducer 120 could be in the form of a bone conduction speaker, also referred to as a bone conduction transducer (BCT). The vibrational transducer 120 can be an electroacoustic transducer that produces sound in response to an electrical audio signal input.

The support structure 110 of the HMD 100 is designed such that when the user wears the HMD 100, the vibrational transducer 120 contacts the user. Alternatively, the vibrational transducer 120 can be embedded within the support structure 110 of the HMD 100 and positioned such that, when the HMD 100 is worn by the user, the vibrational transducer 120 vibrates a portion of the support structure 110 that contacts the user. In either case, HMD 100 can be configured to send the audio signal to vibrational transducer 120, so that vibration of the vibrational transducer 120 may be directly or indirectly transferred to the bone structure of the user. When the vibrations travel, through the bone structure, to the inner ear of the user, the user can interpret the vibrations provided by the vibrational transducer 120, such as BCT, as sounds. In general, the clip-on apparatus utilizes the bone conduction (BC) for data transfer till the skull. The hearing ability is provided by the BC. A bone conducting receptor (the vibrational transducer 120) receives data signals to convert them to sound vibrations.

For e.g., various types of the vibrational transducer 120 may be implemented, depending upon the particular implementation. Generally, any component that is arranged to vibrate the HMD 100 may be incorporated as the vibrational transducer 120. In an embodiment, the support structure 110 can be incorporated with one or more vibrational transducers 120 (i.e., speakers/multiple speakers). In addition, the location(s) of the vibrational transducer 120 on the support structure 110 may vary, depending upon the implementation. For example, the vibrational transducer 120 may be located proximate to a user forehead (e.g., vibrational transducer 120c, 120d), around the area (mastoid process, temporal bones, etc.) of the user ear (e.g., vibrational transducer 120a, 120b, 120e, 1200, proximate to the user chin (e.g., vibrational transducer 120g in FIG. 5A or FIG. 5B), and/or at any other location where the vibrational transducer 120 can vibrate the user bone structure. In another example, the vibrational transducer 120 can be directly placed on the HMD 100, although not shown but can be implemented without departing from the scope of the invention, the other variations of associating the vibrational transducer 120 with the HMD 100 are also possible.

The HMD 100 can include a plurality of sensors (not shown) configured to monitor viewport information of the HMD 100. In an embodiment, the plurality of sensors associated with the HMD 100 can include, for e.g., gyroscopes, one or more accelerometers, one or more magnetometers, one or more light sensors, one or more infrared sensors, and/or one or more microphones. Other sensing devices may be included in addition or in the alternative to the sensors that are specifically identified herein. In an embodiment, the viewport information includes, for e.g., a current field of view of the user, a position of the user within an immersive space, a head-facing direction of the user, and the like. According to various embodiments of the present disclosure, the immersive space can alternatively and/or interchangeably be referred to as "virtual space", or "VR space". Further, the one or more sensors from the plurality of sensors can be configured to locate the exact origin of the at least one audio signal based on the current viewport information.

Further, each of the vibrational transducer 120 can be operably coupled to a binaural audio controller (not shown in this FIG. 4B). The location (position) information of each of the vibrational transducer 120 arranged on the support structure 110 can be communicated with the binaural audio controller, due to its operable connectivity feature with the each of the vibrational transducer 120. Based on the position information of each of the vibrational transducer 120, the binaural audio controller can be configured to determine binaural audio data individually for each of the vibrational transducer 120 and the location of origin of the at least one audio signal. Furthermore, the binaural audio controller can be configured to present the binaural audio data to the user using the corresponding vibrational transducer 120.

Unlike to conventional methods and systems, the binaural audio system 1000 can be used to provide multi-channel (more than 2 channel) sound signal that reaches the user through each of the vibrational transducer 120 and blends inside the brain of the user. This blended sound can be considered as a true binaural sound wave that can be produced in real-time, thereby enhancing the immersive media experience (e.g., VR).

In another embodiment, the binaural audio controller can be a part of the HMD device 100. In an embodiment, the binaural audio controller can be an on-board computing system. The binaural audio controller may be positioned remote from the HMD 100 (e.g., the binaural audio controller be wire- or wirelessly-connected to the HMD 100).

In another embodiment, as shown in FIG. 4B, the vibrational transducer 120 can be placed on a clip-on apparatus 200 instead of being arranged on the support structure 110. The other hardware components operably coupled to the vibrational transducer 120 and/or support structure 110 can be arranged on the clip-on apparatus 200. The clip-on apparatus 200 can be detachably attached to the support structure 110.

FIG. 5A illustrates cross sectional view of the clip-on apparatus 200, according to embodiments as disclosed herein.

Referring to the FIG. 5A, the clip-on apparatus 200 can be detachably attached to the support structure 110. Further, the material used for configuring the clip-on apparatus 200 can be, but not limited to, flexible plastic coated with silicone.

FIG. 5B illustrates an exploded view for accessory parts of the clip-on apparatus 200, according to embodiments as disclosed herein.

Referring to the FIG. 5B, one or more accessory parts of the clip-on apparatus 200 can be detachably attached with each other. Further, in an embodiment, the clamping site 202 can also be easily detached/attached from the surface of the clip-on apparatus 200. The clamping site 202 can be constructed by using any material known/yet to be known in the art. The clip-on apparatus 200 therefore be detachably attached to the HMD 100 using the clamping site 202 through straps (extendable arms) of the HMD 100. In general, the clamping site 202 is used as a mounting position where the HMD 100 is mounted.

FIGS. 6A-6D illustrate various modes of operating the clip-on apparatus 200, according to embodiments as disclosed herein.

Referring to the FIGS. 6A-6B, the clamping site 202 is configured such that the position of the clamping site 202 on the surface of the clip-on apparatus 200 can be varied smoothly (i.e., enabling a slide movement, etc.). The clip-on apparatus 200 is more adjustable and can be applicable in almost every user regardless of head size, and content type. Since the entire process involves bone conduction, even the deaf can hear sounds.

Also, as shown in FIG. 6B-6D, the relative movement between each vibrational transducers 120 can be easily adjustable with 2 degrees of freedom, such that an optimal experience for every user is provided thereof.

FIG. 7 is a flow diagram illustrating a method for producing the binaural audio data to the user, according to embodiments disclosed herein.

At step 702, the method includes detecting at least one audio signal and the current viewport information of the user wearing the HMD 100. In an embodiment, the method allows the HMD 100 to detect at least one audio signal and the current viewport information of the user wearing the HMD 100.

At step 704, the method includes determining the location of origin of the at least one audio signal based on the current viewport information. In an embodiment, the method allows the HMD 100 to determine the location of origin of the at least one audio signal based on the current viewport information.

At step 706, the method includes determining the binaural audio data individually for each of vibrational transducer 120 arranged on the support structure 110 of the HMD device 110 based on the location of origin of the at least one audio signal. In an embodiment, the method allows the binaural audio controller to determine the binaural audio data individually for each of vibrational transducer 120 arranged on the support structure 110 of the HMD device 110 based on the location of origin of the at least one audio signal.

According to various embodiments of the present disclosure, different weights can be applied to audio data for each of the plurality of vibrational transducers. Herein, the weight may correspond to a vibration intensity. For example, if a location of a source of the audio signal is determined in VR space, HMD 100 can determine distance between the source of the audio signal and each of the plurality of vibrational transducers in VR space. HMD 100 can determine a weight to be applied to audio data for each of the plurality of vibrational transceivers based on the distance between the source of the audio signal and each of the plurality of vibrational transducers in VR space. For example, if a distance between a vibrational transducer and the source of the audio signal is close, HMD 100 can apply relatively low weight to audio data for the vibrational transducer. In contrast, if a distance between a vibrational transducer and the source of the audio signal is far, HMD 100 can apply relatively high weight to audio data for the vibrational transducer. The HMD 100 can apply weights to audio data for each of the plurality of vibrational transducers, and transmit the weightapplied audio data to each of the plurality of vibrational transceivers. Each of the plurality of vibrational transducers can receive audio data, and vibrate on a vibration intensity corresponding to the weight to play the received audio data.

According to various embodiments of the present disclosure, no particular audio coding technique or audio coding format is required to determine or generate binaural audio data. That is, any audio coding technique or audio coding format (which can be conventional or newly introduced) can be used to determine or generate binaural audio data.

At step 708, the method includes present the binaural audio data to the user using the corresponding vibrational transducer 120. In an embodiment, the method allows the binaural audio controller to present the binaural audio data to the user using the corresponding vibrational transducer 120. For e.g., the binaural audio data to the user can be presented, but not limited, through a front-right transducer (e.g, vibrational transducer 120b), back-right transducer (e.g., vibrational transducer 120a), back-left transducer (e.g., vibrational transducer 1200, front-left transducer (e.g., vibrational transducer 120fe) arranged on the support structure 110 worn by the user/arranged on the clip-on apparatus 200 detachably attached to the support structure 110.

FIG. 8 illustrates a scenario in which the location of the sound source is detected by the user wearing the HMD 100, according to embodiments as disclosed herein.

Referring to FIG. 8, at step-1, consider a scenario that the user of the HMD 100 roaming in VR space, hears the sound signal coming from right side of the user position. As a result, at step-2, the user turns right in the VR space to find sound source, as user turns his head, each of the vibrational transducers 120 can be configured to collect all the sensor information (e.g., direction of the user, direction of field of view (FOV), distance between the user and the sound source, etc.) which can aid the user in determining the location of the sound source. Thus, unlike to conventional methods and system, with the proposed method, the user may finally be able to spot the sound source solely on the basis of audio cues (as shown in step 3).

FIG. 9 is a block diagram illustrating various components of the binaural audio system 1000. The components in the binaural audio system 1000 may be implemented in hardware, software, or a combination of hardware and software. In an embodiment, the binaural audio system 1000 includes the vibrational transducer 120, sensor 130, a view port controller 140, a binaural audio controller 150, a processor 160 (e.g., Central processing unit (CPU), Graphics processing unit (GPU), hardware chipset, etc.) communicatively coupled to a memory 170 (e.g., a volatile memory and/or a non-volatile memory). The memory 170 includes storage locations configured to be addressable through the processor 160, and a communicator (not shown) configured to communicate internally with aforementioned components, other components, and externally with other components/electronic devices through any of the existing network communication means.

In an embodiment, the operations of the vibrational transducer 120 is detailed in FIG. 4B. The sensor 130 can be for e.g., gyroscopes, one or more accelerometers, one or more magnetometers, one or more light sensors, one or more infrared sensors, and/or one or more microphones (as detailed in FIG. 4B).

In an embodiment, the operations of the binaural audio controller 150 (i.e., the binaural audio controller) is detailed in the FIG. 4B. The view port controller 140 can be coupled with the binaural audio controller 150 and is configured to detect the current viewport information of the user wearing the HMD device 100.

The memory 170 may include one or more computer-readable storage media. The memory 170 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 170 may, in some examples, be considered a non-transitory storage medium. The term "non-transitory" may indicate that the storage medium is not embodied in a carrier wave or a propagated signal. However, the term "non-transitory" should not be interpreted to mean that the memory 170 is non-movable. In some examples, the memory 170 can be configured to store larger amounts of information than the memory. In certain examples, a non-transitory storage medium may store data that can, over time, change (e.g., in Random Access Memory (RAM) or cache).

In alternative embodiment, all the aforementioned components of the binaural audio system 1000, shown herein, can be implemented at the HMD device 100. In yet another alternative embodiment, all the aforementioned components of the binaural audio system 1000 can be implemented in the clip-on apparatus 200.

The FIG. 9 shows exemplary components of the binaural audio system 1000 but it is to be understood that other embodiments are not limited thereon. In other embodiments, the binaural audio system 1000 may include less or more number of components. Further, the labels or names of the components are used only for illustrative purpose and does not limit the scope of the invention. One or more components can be combined together to perform same or substantially similar function in the binaural audio system 1000.

The embodiments disclosed herein can be implemented using at least one software program running on at least one hardware device and performing network management functions to control the elements.

FIG. 10 is an example scenario in which a realistic doppler effect can be obtained, according to embodiments as disclosed herein.

Referring to FIG. 10, an approaching sound seems shriller than it actually is, and the opposite for a receding sound, the shriller is based on the velocity of the sound source. Unlike to conventional methods and conventional systems, the proposed method can be used to determine the velocity of the sound source by identifying the distance covered by the sound signal in a time interval. Further, the method can be used to alter the frequencies of the sound signal based on approaching sound source's current location. In an embodiment, the output intensity for each of the vibrational transducer 120 is monitored by using the equations-1 & 2 (expressed in the FIG. 3B), updated based on the location and velocity of the sound source.

Source Receding:

$$f_{observed} = \left[\frac{v}{v + v_{source}}\right] f_{source} \qquad \text{Equation (1)}$$

Source Approaching:

$$f_{observed} = \left[\frac{v}{v - v_{source}}\right] f_{source} \quad \text{Equation (2)}$$

For e.g., Facebook® spaces aims to provide a common platform for plurality of users who are miles away and spend some quality time and create memories in the VR space. Thus, based on the proposed method, the optimal 3D-audio signals can be provided. Thus, improving the user experience in the Facebook® spaces by providing the binaural audio thereof, as the user may don't want any sound signals from all over the place to only appear to come from either the right or the left direction.

In another e.g., of gaming scenario, the proposed method can be used to enable a never-before gaming environment to the users by virtue of providing actually feel the thrill and the excitement.

Also, an audio system (which may comprise vibrational transducers 120) according to various embodiments of the present disclosure can support a surround sound such as 5.1 channel sound. For example, the audio system can support the surround sound by assuming that audio signals come from a plurality of virtual sound source, and providing a weighted audio data to each of the vibrational transducers considering locations of the plurality of virtual sound sources.

According to various embodiments of the present disclosure, a head mounted display (HMD) device is provided. The HMD comprises a support structure, a plurality of vibrational transducers placed on the support structure, and a binaural audio controller, operably coupled to each of the plurality of vibrational transducers. The binaural audio controller is configured to detect at least one audio signal, determine a location of a source of the at least one audio signal based on viewpoint information of a user wearing the HMD device, generate audio data for each of the plurality of vibrational transducers based on the location of the source of the at least one audio signal, and control the plurality of vibrational transducers by transmitting the audio data to each of the plurality of vibrational transducers.

According to various embodiments of the present disclosure, a weight is applied to the audio data for each of the plurality of vibrational transducers. The weight correspond to a vibration intensity of each of the plurality of transducers.

According to various embodiments of the present disclosure, the binaural audio controller is further configured to determine a distance between the source of the at least one audio signal and each of the plurality of transducers in virtual reality (VR) space, and determine the weight based on the distance.

According to various embodiments of the present disclosure, the binaural audio controller is further configured to control each of the plurality of vibrational transducers to vibrate on the vibration intensity.

According to various embodiments of the present disclosure, each of the plurality of vibrational transducers are adapted to be placed in contact with the user at a location such that at least one vibrational transducer is coupled to a bone structure of the user.

According to various embodiments of the present disclosure, the viewport information comprises at least one of a field of view of the user, a position of the user within a virtual reality (VR) space, or a head-facing direction of the user According to various embodiments of the present disclosure, the at least one audio signal is generated when a user is interacting in a virtual reality (VR) space.

According to various embodiments of the present disclosure, at least one vibrational transducer from the plurality of vibrational transducers is adapted to be placed in contact with a forehead area of the user.

According to various embodiments of the present disclosure, at least two vibrational transducers from the plurality of vibrational transducers are adapted to be placed in contact with an ear area of the user.

According to various embodiments of the present disclosure, at least one vibrational transducer from the plurality of vibrational transducers is adapted to be placed in contact with a chin area of the user.

According to various embodiments of the present disclosure, a localization of the at least one audio signal is obtained by dynamically changing at least one of an intensity and a weight imparted to each of the vibrational transducers based on the location of the source of the at least one sound signal.

According to various embodiments of the present disclosure, a virtual reality (VR) space across the HMD is created based on a 3 dimensional (3D) location of at least four non-planar points corresponding to at least four transducers from the plurality of vibrational transducers, wherein at least three points in the at least four non-coplanar points are non-collinear.

According to various embodiments of the present disclosure, the plurality of vibrational transducers comprises bone conduction transducers (BCTs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A head mounted display (HMD) device comprising:
   a support structure;
   a clamping site disposed on the support structure to detach and attach the support structure from the HMD;
   a plurality of vibrational transducers, wherein the plurality of vibration transducers is placed on the support structure, and positions of the plurality of vibration transducers placed on the support structure are different from each other; and
   a binaural audio controller, operably coupled to each of the plurality of vibrational transducers, configured to:
      detect at least one audio signal and current viewport information of a user wearing the HMD device,
      determine a location of an original of the at least one audio signal in an immersive space based on the current viewport-information, determine binaural audio data individually for each of the plurality of vibrational transducers based on the location of the original of the at least one audio signal, and present the determined binaural audio data to a corresponding vibrational transducer from among the plurality of vibrational transducers, wherein the current viewport information includes a field of view of the user, a position of the user within the immersive space and a head-facing direction of the user, and wherein the plurality of vibrational transducers includes a first vibrational transducer which is adapted to be placed in contact with a forehead area of the user and a second vibrational transducer which is adapted to be placed in contact with a chin area of the user.

2. The HMD of claim 1, wherein a weight is applied to the binaural audio data for each of the plurality of vibrational transducers, and wherein the weight corresponds to a vibration intensity of each of the plurality of vibrational transducers.

3. The HMD of claim 2, wherein the binaural audio controller is further configured to:

determine a distance between the location of the original of the at least one audio signal and each of the plurality of vibrational transducers in the immersive space, and determine the weight based on the distance.

4. The HMD of claim 2, wherein the binaural audio controller is further configured to control each of the plurality of vibrational transducers to vibrate on the vibration intensity.

5. The HMD of claim 1, wherein each of the plurality of vibrational transducers are adapted to be placed in contact with the user at a location such that at least one vibrational transducer is coupled to a bone structure of the user.

6. The HMD of claim 1, wherein the at least one audio signal is generated when user is interacting in immersive space.

7. The HMD of claim 1, wherein at least two vibrational transducers from the plurality of vibrational transducers are adapted to be placed in contact with an ear area of the user.

8. The HMD of claim 1, wherein an effect of a localization of the at least one audio signal perceived by the user wearing the HMD is obtained by dynamically changing at least one of an intensity and a weight imparted to each of the plurality of vibrational transducers based on the location of the original of the at least one audio signal.

9. The HMD of claim 1, wherein the immersive space across the HMD is created based on a 3 dimensional (3D) location of at least four non-planar points corresponding to at least four transducers from the plurality of vibrational transducers, wherein at least three points in the at least four non-planar points are non-collinear.

10. The HMD of claim 1, wherein the plurality of vibrational transducers comprises bone conduction transducers (BCTs).

11. A method for operating a head mounted display (HMD) device comprising:

detecting at least one audio signal and a current viewport information of a user wearing the HMD device;

determining a location of an original of the at least one audio signal in an immersive space based on the current viewport information;

determining binaural audio data individually for each of a plurality of vibrational transducers placed on the support structure, which is separated and attached from the HMD by a clamping portion disposed on the support structure, based on the location of the original of the at least one audio signal; and presenting the determined binaural audio data to a corresponding vibrational transducer from among the plurality of vibrational transducers, wherein the current viewport information includes a field of view of the user, a position of the user within the immersive space and a head-facing direction of the user, wherein positions of the plurality of vibration transducers placed on the support structure are different from each other, and wherein the plurality of vibrational transducers includes a first vibrational transducer which is adapted to be placed in contact with a forehead area of the user and a second vibrational transducer which is adapted to be placed in contact with a chin area of the user.

12. The method of claim 11, wherein a weight is applied to the binaural audio data for each of the plurality of vibrational transducers, and wherein the weight corresponds to a vibration intensity of each of the plurality of vibrational transducers.

13. The method of claim 12, further comprising:

determining a distance between the location of the original of the at least one audio signal and each of the plurality of transducers in the immersive space, and determining the weight based on the distance.

14. The method of claim 12, further comprising:

controlling each of the plurality of vibrational transducers to vibrate on the vibration intensity.

15. The method of claim 11, wherein an effect of a localization of the at least one audio signal perceived by the user wearing the HMD is obtained by dynamically changing at least one of an intensity and a weight imparted to each of the plurality of vibrational transducers based on the location of the original of the at least one audio signal.

16. The method of claim 11, wherein the immersive space across the HMD is created based on a 3 dimensional (3D) location of at least four non-planar points corresponding to at least four transducers from the plurality of vibrational transducers, wherein at least three points in the at least four non-planar points are non-collinear.

* * * * *